Patented Apr. 7, 1942

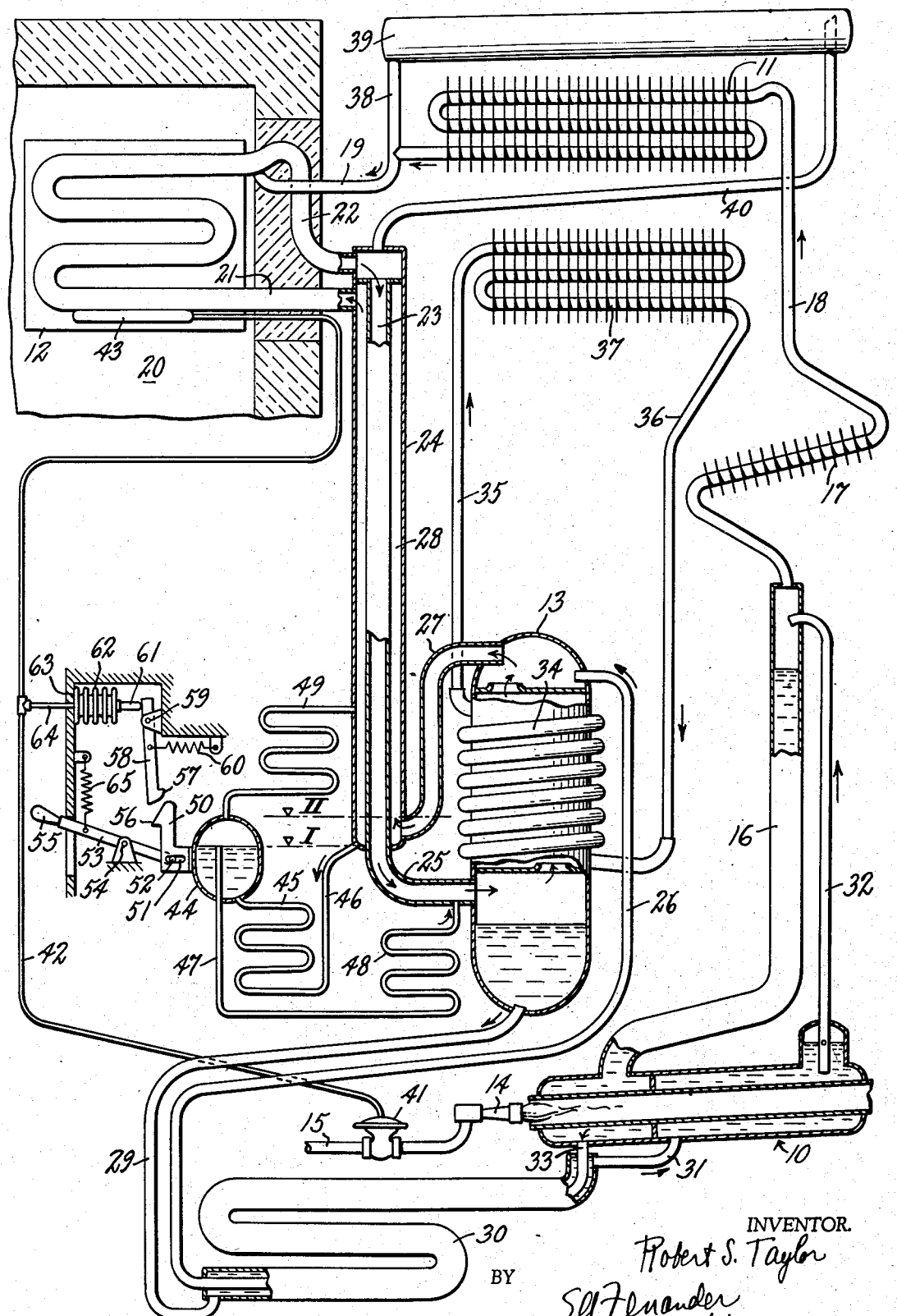

2,279,080

UNITED STATES PATENT OFFICE 2,279,080

REFRIGERATION

Robert S. Taylor, Evansville, Ind., assignor to Servel, Inc., New York, N. Y., a corporation of Delaware Application November 22, 1939, Serial No. 305,577

19 Claims. (Cl. 62—5)

My invention relates to refrigeration, and more particularly to a refrigeration system of the kind containing an auxiliary agent or inert gas into which refrigerant evaporates.

It is an object of the invention to provide an improvement in systems of this type for rapidly defrosting a cooling element or evaporator by stopping circulation of the auxiliary agent or inert gas in a gas circuit. I accomplish this by collecting liquid in an accumulator and connecting the latter to other parts of the system in such a manner that it can be bodily raised to cause flow of liquid therefrom into the gas circuit to block off and stop circulation of the auxiliary agent or inert gas, whereby defrosting is instigated. The accumulator may be so arranged that, when defrosting is substantially terminated, the accumulator is automatically lowered to permit removal of liquid from the gas circuit and again permit circulation of auxiliary agent or inert gas. The liquid collected in the accumulator may be condensate formed in a gas heat exchanger in the gas circuit, and, after the accumlator is filled to a predetermined level so that it is capable of stopping gas circulation when raised, the condensate may be conducted to the absorption liquid circuit of the refrigeration system.

The invention, together with the above and other objects and advantages thereof, will be better understood from the following description taken in conjunction with the accompanying drawing forming a part of this specification, and of which the single figure more or less diagrammatically illustrates a refrigeration system embodying the invention.

In the drawing I have shown the invention embodied in an absorption refrigeration system of a uniform pressure type containing a pressure equalizing gas or auxiliary agent. A system of this type includes a generator 10, condenser 11, cooling element or evaporator 12 and an absorber 13 which are inter-connected in a manner well known in the art and which will now be briefly described. The system contains a solution of refrigerant in absorption liquid, such as ammonia in water, for example, and also an auxiliary agent or inert gas, such as hydrogen.

The generator 10 is heated in any suitable manner, as by a gas burner 14, for example, which is supplied with suitable combustible gas through a conduit 15. By heating generator 10 refrigerant vapor is expelled out of solution and flows upward through a standpipe 16, an air-cooled rectifier 17, and a conduit 18 into the condenser 11 in which it is liquefied. Liquid refrigerant flows from condenser 11 through a conduit 19 into the cooling element or evaporator 12 disposed in thermally insulated space 20.

Liquid refrigerant in cooling element 12 evaporates and diffuses into the inert gas whereby heat is abstracted from the surroundings to produce a refrigerating effect. The inert gas enters the lower end of cooling element 12 through a conduit 21. The resulting rich gas mixture of refrigerant vapor and inert gas formed in cooling element 12 flows from the upper end thereof through a conduit 22, inner passage 23 of a gas heat exchanger 24, and a conduit 25 into the lower part of the absorber 13.

In absorber 13 the rich gas mixture flows counter-current to downwardly flowing weak absorption liquid which enters through a conduit 26. The absorption liquid absorbs refrigerant vapor from the inert gas, and inert gas weak in refrigerant flows from absorber 13 through a conduit 27, outer passage 28 of gas heat exchanger 24, and conduit 21 into the lower part of cooling element 12.

Absorption liquid enriched in refrigerant flows from the lower part of absorber 13 through a conduit 29, outer passage of a liquid heat exchanger 30, and conduit 31 into generator 10. Liquid is raised in the generator through a tube 32 by vapor-liquid lift action and flows back to the generator through standpipe 16. The refrigerant vapor expelled out of solution in generator 10 and flowing upwardly in standpipe 16, together with refrigerant vapor entering the latter through tube 32, flows upwardly through standpipe 16, rectifier 17 and conduit 18 into the condenser 11, as explained above.

The absorption liquid from which refrigerant has been expelled flows from generator 10 through a conduit 33, inner passage of liquid heat exchanger 30, and conduit 26 to the upper part of absorber 13. This circulation of absorption liquid results from the raising of liquid by vapor-liquid lift action in tube 32.

Heat liberated with absorption of refrigerant vapor in absorber 13 is transferred to a cooling medium which circulates through a coil 34 arranged in thermal exchange relation with the absorber. As shown, coil 34 is connected by conduits 35 and 36 to a looped coil 37. The coils 34 and 37 and inter-connecting conduits form a closed circuit which is partly filled with a volatile liquid that vaporizes in coil 34 and liquefies in coil 37. The liquid evaporating in coil 34 takes up heat from absorber 13 and the vapor liquefying in coil 37 gives up heat to surrounding air.

The lower end of condenser 11 is connected by a conduit 38, vessel 39 and conduit 40 to the gas circuit, as at the upper end of gas heat exchanger 28, for example. By connecting the vessel 39 to the outlet end of condenser 11 and to the gas circuit, any inert gas which may pass through the condenser can flow into the gas circuit. Refrigerant vapor not liquefied in the condenser flows into vessel 39 to displace inert gas therefrom into the gas circuit. The effect of forcing gas into the gas circuit in this manner is to increase the total pressure through the system to insure condensation of refrigerant vapor in condenser 11.

During normal operation of the system, refrigerant fluid, inert gas, and absorption liquid circulate in the manner described above whereby cooling element 12 produces a refrigerating effect. Inert gas or hydrogen circulates continuously in the gas circuit including cooling element 12 and absorber 13. This circulation of inert gas is due to the difference in specific weight of the column of rich gas flowing from the upper end of cooling element 12 to the lower part of absorber 13, and the column of gas weak in refrigerant and flowing from the upper part of absorber 13 to the lower part of cooling element 12. Due to the difference in specific weight of the columns of rich and weak gas, therefore, a force is developed within the system for causing circulation of gas in the inert gas circuit.

The burner 14 is controlled in response to a temperature condition affected by cooling element 12. As shown, a control valve 41 is connected in conduit 15. The valve 41 is connected by a capillary tube 42 to a thermal bulb 43 which is arranged in good thermal contact with cooling element 12. The tube 42 and bulb 43 form part of an expansible fluid thermostat containing a suitable volatile fluid for controlling valve 41 and hence the flow of gas to burner 14. When the cooling element 12 tends to fall below a predetermined temperature, the expansible fluid thermostat operates valve 41 to reduce the flow of gas to burner 14. Conversely, when the cooling element 12 tends to rise above the predetermined temperature, the expansible fluid thermostat operates valve 41 to increase the flow of gas to burner 14.

The temperature at which evaporation of refrigerant takes place in cooling element 12 is dependent upon the partial pressure of refrigerant vapor. During normal operation of the system, inert gas rich in refrigerant vapor and flowing from cooling element 12 is constantly replaced by inert gas weak in refrigerant vapor, whereby the partial pressure of refrigerant vapor in cooling element 12 is such that evaporation of liquid takes place at a temperature below the freezing temperature of water. With the cooling element 12 being operated at this low temperature, a layer of frost or ice is formed thereon due to condensation of water vapor from air flowing in contact with the surfaces of the cooling element.

In order to melt the layer of frost or ice formed on the surface of cooling element 12, liquid in the system is caused to flow into the gas circuit to stop the circulation of the inert gas. When this is done the flow of inert gas and refrigerant vapor from cooling element 12 stops and the partial pressure of refrigerant vapor in the cooling element increases. With such increase in the partial pressure of refrigerant vapor in cooling element 12 the temperature thereof rises above the freezing temperature of water and very rapid melting of the frost or ice is effected.

In accordance with this invention, in order to effect defrosting in the manner just explained, I provide a liquid accumulator 44. The lower part of accumulator 44 is connected by a looped coil 45 and a conduit 46 to the extreme lower end of the outer passage 28 of gas heat exchanger 24. A vertical conduit 47 extends into the upper part of accumulator 44 and is connected at its lower end to a looped coil 48. The upper end of looped coil 48 is connected to conduit 25 at an elevation below the upper end of conduit 47. The upper end of accumulator 44 is connected by another looped coil 49 to the outer passage 28 of gas heat exchanger 24 at an elevation above the upper end of conduit 46.

The looped coils 45, 48 and 49 are flexible with respect to the other parts of the system to which they are connected, so that accumulator 44 can be raised and lowered. Raising and lowering of an accumulator 44 may be effected by suitable mechanism in any desired manner. As shown, a bracket 50 secured to accumulator 44 is provided with an elongated opening 51 to receive a pin 52 fixed to the outer end of a lever 53 pivoted at 54 to a suitable support. When the handle 55 of lever 53 is moved downwardly, the accumulator 44 and bracket 50 are raised whereby a catch 56 formed at the upper end of bracket 50 engages a catch 57 formed at the lower end of a lever 58 pivoted at 59 to a suitable support. A spring 60 keeps the catches 56 and 57 in their engaged position.

A pin 61 bears against the upper end of lever 58. The pin 61 is fixed to the outer end of an expansible and contractible bellows 62 which is secured at 63 to a suitable support. The bellows 62 is connected by a capillary tube 64 to the capillary tube 42 whereby the same expansible fluid thermostat that operates control valve 41 also operates the mechanism just described to control the defrosting periods, as will presently be explained.

During operation of the system condensate accumulates in the extreme lower end of the outer passage 28 of gas heat exchanger 24. This condensate flows through conduit 46 and looped coil 45 into accumulator 44 whereby the latter becomes filled with liquid. When the liquid level in accumulator 44 reaches the upper end of conduit 47, liquid flows through the latter and looped coil 48 into conduit 25 and thence into the lower part of absorber 13. When accumulator 44 is in the lower position shown in the drawing, therefore, condensate is drained from the extreme lower end of the outer passage 28 of gas heat exchanger 24 and conducted to the absorption liquid circuit in the lower part of absorber 13. While such draining of condensate is being effected from the lower end of gas heat exchanger 24, the accumulated or collected liquid is at the level I and the lower end of conduit 27 is in open and unrestricted communication with the outer passage 28 of the gas heat exchanger. Under these conditions normal circulation of inert gas takes place in the gas circuit in the manner explained above.

When a layer of frost or ice has formed on cooling element 12 and it is desired to effect defrosting, the handle 55 of lever 53 is pressed downwardly against the action of spring 65 to move accumulator 44 upwardly and raise the liquid therein to the level II indicated in the drawing. When this is done, liquid flows into the extreme lower end of the outer passage 28 of gas heat exchanger 24 to form a liquid seal and block flow of inert gas returning through conduit 27 from absorber 13 to cooling element 12. When the circulation of inert gas in the gas circuit is stopped in this manner, the temperature of cooling element 12 rises above the freezing temperature of water and very rapid melting of the frost or ice accumulated on the surfaces of cooling element 12 is effected.

When the accumulator 44 is raised to its upper position by pressing the handle 55 of lever 53 downwardly, the handle 55 may immediately be released since the spring 60 holds the catches 56 and 57 in engagement, as explained above. At the beginning of a defrosting period cooling element 12 is at a temperature below the freezing temperature of water and the volume of the volatile fluid in the expansible fluid thermostat is such that spring 60 is able to hold the catches 56 and 57 in engagement against the action of bellows 62.

When cooling element 12 is substantially defrosted and the temperature of the latter rises above the freezing temperature of water, the volatile fluid in the expansible fluid thermostat increases in volume whereby bellows 62 expands and causes lever 58 to move in a clockwise direction against the action of spring 60 whereby the catches 56 and 57 become disengaged. This permits spring 65 to move the outer end of lever 53 upwardly and cause downward movement of accumulator 44 to its lower position. This permits liquid to drain from the extreme lower end of the outer passage 28 of gas heat exchanger 24 until the liquid again falls to level I and conduit 27 is again in unrestricted communication with the lower end of gas heat exchanger 24. When defrosting is substantially terminated, therefore, the accumulator 44 is automatically lowered to open the liquid seal in the gas circuit and again permit normal circulation of inert gas therein. The looped coil 49 connecting the vapor space of accumulator 44 and the outer passage 28 of gas heat exchanger 24 serves as a vent so that the vapor pressure above the liquid in accumulator 44 is the same as that in the outer passage 28. The flexible metal connections including looped coils 45, 48 and 49 are shaped so that they will be springy in action and have a relatively small internal diameter.

Instead of connecting bellows 62 in the same expansible fluid thermostat as that controlling the operation of burner 14, the bellows 62 may be connected by capillary tube 64 to a separate thermal bulb in thermal exchange relation with cooling element 12. In such case the bellows 62 will operate in the same manner explained above to automatically terminate defrosting of cooling element 12.

While a single embodiment of the invention has been shown and described, such variations and modifications are contemplated which fall within the true spirit and scope of the invention, as pointed out in the following claims.

What is claimed is:

1. In an absorption refrigeration system having a gas circuit including an evaporator and an absorber, an accumulator for collecting liquid in the system, and a flexible conduit connecting said accumulator and a part of said gas circuit to cause liquid to enter into said gas circuit and block off circulation of gas therein when said accumulator is raised.

2. In a refrigeration system as set forth in claim 1 having an absorption liquid circuit including said absorber, a flexible conduit connected to said accumulator to permit liquid to flow from the latter into said absorption liquid circuit after the liquid reaches a predetermined level in said accumulator.

3. In an absorption refrigeration system having a gas circuit including an evaporator and an absorber and an absorption liquid circuit including said absorber, a vessel, a conduit to drain liquid from a part of said gas circuit into said vessel for accumulation in the latter, and means to withdraw liquid from said vessel into said gas circuit to block off circulation of gas therein, such withdrawal of liquid from said vessel being effected without interfering with the normal flow of liquid in said absorption liquid circuit.

4. A refrigeration system as set forth in claim 3 in which said vessel is vertically movable to cause withdrawal of liquid therefrom into said gas circuit to block off circulation of gas therein.

5. In a refrigeration system as set forth in claim 3, a conduit for draining liquid from said vessel to said absorption liquid circuit after the liquid reaches a predetermined level in said vessel.

6. In an absorption refrigeration system having a gas circuit including an evaporator and an absorber and an absorption liquid circuit including the absorber, a vessel, a conduit connected to conduct liquid from a part of the system into said vessel for accumulation in the latter, structure embodied in the system whereby liquid can be withdrawn from said vessel into a part of said gas circuit through which absorption liquid does not circulate to block off circulation of gas in said gas circuit, and means responsive to a condition in the system for returning liquid from said gas circuit to said vessel to permit circulation of inert gas in the gas circuit.

7. A method of refrigeration which includes evaporating refrigerant fluid in a place of evaporation in the presence of circulating auxiliary agent to produce a refrigerating effect, draining and collecting condensate formed in the path of circulation of said auxiliary agent, and causing increase in temperature at the place of evaporation by utilizing the collected condensate to form a liquid seal to stop circulation of the auxiliary agent.

8. A method as set forth in claim 7 in which the liquid seal is removed upon increase in a temperature condition affected by the place of evaporation.

9. A method as set forth in claim 7 in which collected condensate is raised to form the liquid seal.

10. In an absorption refrigeration system having an inert gas circuit including an evaporator and an absorber and an absorption liquid circuit including said absorber, the inert gas circuit including a gas heat exchanger having a first passage for conducting inert gas from said evaporator to said absorber and a second passage for flowing inert gas from said absorber to said evaporator, a vessel, conduit means connecting said second passage and the lower part of said vessel, conduit means for conducting liquid from said vessel to said absorption liquid circuit after the liquid reaches a predetermined level in said vessel, conduit means connecting the vapor space of said vessel and said second passage to provide a vent, and all of said conduit means being flexible to permit raising of said vessel to cause liquid to flow into said gas circuit and block off circulation of inert gas therein.

11. In an absorption refrigeration system as set forth in claim 10, mechanism for raising said vessel and retaining the latter in its raised position.

12. In an absorption refrigeration system as set forth in claim 10, mechanism for raising said vessel and retaining the latter in its raised position, and means responsive to a temperature condition affected by said evaporator for automatically lowering said vessel to withdraw liquid from said gas circuit and permit circulation of gas in the gas circuit.

13. In an absorption refrigeration system having a gas circuit including an absorber and an evaporator subject to formation of frost or ice, a part connected to said gas circuit and adapted to receive liquid in the system, means to cause removal of liquid from said part to said gas circuit to block off circulation of gas therein and cause melting of any frost formed on said evaporator, and means responsive to a substantially defrosted condition of said evaporator to cause removal of blocking liquid from said gas circuit.

14. In a refrigerating system having a gas circuit including an evaporator subject to formation of frost or ice, a part connected to said gas circuit and adapted to receive liquid in the system, means to cause removal of liquid from said part to such a part of said gas circuit as to block off circulation of gas therein and permit melting of frost on said evaporator, and means responsive to a substantially defrosted condition of said evaporator to cause removal of blocking fluid from said gas circuit in a liquid state.

15. In a refrigerating system having a gas circuit including an evaporator subject to formation of frost or ice, a part connected to said gas circuit and adapted to receive condensate formed in said system, means to cause removal of condensate from said part to said gas circuit to block off circulation of gas therein and permit melting of frost on said evaporator, and means responsive to a substantially defrosted condition of said evaporator to cause removal of blocking condensate from said gas circuit in a liquid state.

16. In an absorption refrigerating system having a gas circuit including an evaporator and an absorber, a part receiving liquid in the system, a flexible conduit connecting said part and said gas circuit whereby, when said part is raised, liquid flows from said part into said gas circuit to block off circulation of gas therein, and mechanism operable to hold said part in a raised position and also release said part to permit movement thereof to a lower position responsive to a condition of the system.

17. In an absorption refrigeration system having a gas circuit including an evaporator and an absorber and an absorption liquid circuit including the absorber, a part adapted to receive liquid, and structure embodied in the system whereby liquid can be removed from said part to said gas circuit to block off circulation of gas therein, said part being so connected and arranged in said system that a definite quantity of liquid is always segregated thereby from the liquid circulating in the absorption liquid circuit during operation of the system.

18. In a refrigeration system having a gas circuit including an evaporator and an absorber and an absorption liquid circuit including the absorber, a part of said gas circuit being adapted to hold liquid in a manner to cut off circulation of gas therein, means for draining liquid from said part during normal operation of the system and collecting a quantity of such drained liquid, and means operable to cause flow of the collected liquid into said part to block off circulation of gas in the gas circuit.

19. In a refrigeration system as set forth in claim 18, means responsive to increase in temperature to cause resumption of draining of liquid from said part to permit circulation of gas in the gas circuit.

ROBERT S. TAYLOR.